United States Patent [19]
Chang

[11] Patent Number: 5,708,340
[45] Date of Patent: Jan. 13, 1998

[54] POWER DRIVE CONTROL DEVICE OF AN AUTOMATIC DOOR

[75] Inventor: Fu-Yuan Chang, Taipei, Taiwan

[73] Assignee: Ta Chien Machinery & Electronic Industrial Co., LTD., Taipei Hsien, Taiwan

[21] Appl. No.: 741,124

[22] Filed: Oct. 30, 1996

[51] Int. Cl.$^6$ .......................... H02K 7/10; E05F 13/00; E05F 15/00
[52] U.S. Cl. .................. 318/480; 318/442; 318/466; 318/469; 49/139; 49/199; 160/193
[58] Field of Search .................. 318/434, 490; 160/133, 130, 188, 131, 189; 49/139, 199, 200, 28, 360; 403/223, 374, 287; 310/88, 89; 192/1.37, 139, 143

[56] References Cited

U.S. PATENT DOCUMENTS

| | | | |
|---|---|---|---|
| 3,874,117 | 4/1975 | Boehm | 49/264 |
| 4,191,237 | 3/1980 | Voege | 160/188 |
| 4,472,910 | 9/1984 | Iha | 49/139 |
| 4,597,428 | 7/1986 | Iha | 160/188 |
| 4,653,565 | 3/1987 | Iha et al. | 160/193 |
| 4,795,867 | 1/1989 | Ohi et al. | 200/37 R |
| 4,902,953 | 2/1990 | Kraft et al. | 318/663 |
| 5,197,582 | 3/1993 | Cropley | 192/1.37 |
| 5,243,784 | 9/1993 | Whitaker et al. | 49/199 |

Primary Examiner—Paul Ip
Attorney, Agent, or Firm—Jacobson, Price, Holman & Stern, PLLC

[57] ABSTRACT

A power drive control device of an automatic door, including a gear box having a shell; and a motor drive, the motor drive having a front cover integrally made with the shell of the gear box together, and a back cover covered on the front cover to hold a motor shaft, a stator coil around the motor shaft, a light chopper, and a photoelectric pick-up device, the front cover having a receiving chamber, two recessed holes and one screw hole formed in the receiving chamber and adapted for securing the photoelectric pick-up device in place, the light chopper being mounted around a bearing around the motor shaft to act with the photoelectric pick-up device, enabling the photoelectric pick-up device to monitor the operation of the motor shaft.

4 Claims, 9 Drawing Sheets

POWER DRIVE CONTROL DEVICE OF AN AUTOMATIC DOOR

BACKGROUND OF THE INVENTION

The present invention relates to automatic doors, and relates more particularly to the power drive control device of an automatic door in which the photo chopper and the photoelectric pick-up device are installed into the motor drive for monitoring the operation of the motor drive.

The power drive control device of a conventional automatic door, as shown in FIG. 8, comprises a motor drive A having a motor shaft A1 extending out of a back cover A2, a photo chopper A3 fastened to the motor shaft A1 outside the back cover A2 by a screw A11, photoelectric pick-up means A4 spaced around the photo chopper A3 to detect the revolving speed of the motor shaft A1 by emitting light from one side and receiving light from an opposite side, and a dust cover A5 covered on the back cover A2 of the motor drive A over the photo chopper A3 and the photoelectric pick-up means A4. Because the photo chopper A3 is secured in place by the screw A11, a detecting error will occur when the screw A11 is loosened. Referring to FIG. 9, in order to eliminates transmission of shock waves from the motor drive A to the door frame, upright supporting cushions C are installed in the door frame to suspend the motor drive control device. Because the dust cover A5 projects from the back cover A2 of the motor drive A2, the back cover A2 of the motor drive A2 cannot be directly mounted on the upright supporting cushions C. Therefore, two L-shaped brackets D are fastened to the upright supporting cushions C and respectively fixed to the back cover A2 of the motor drive A and the front cover B1 of the gear box B of the power drive control device. Furthermore, because the front cover A5 of the motor drive A, the gear box B, and the front cover B1 of the gear box B are separately made and then fastened together by fastening means, the assembly process of the power drive control device is complicated.

SUMMARY OF THE INVENTION

The present invention has been accomplished to provide a motor drive control device which eliminates the aforesaid drawbacks. According to the present invention, the power drive control device comprises a gear box having a shell; and a motor drive, the motor drive having a front cover integrally made with the shell of the gear box together, and a back cover covered on the front cover to hold a motor shaft, a stator coil around the motor shaft, a light chopper, and a photoelectric pick-up device, the front cover having a receiving chamber, two recessed holes and one screw hole formed in the receiving chamber and adapted for securing the photoelectric pick-up device in place, the light chopper being mounted around a bearing around the motor shaft to act with the photoelectric pick-up device, enabling the photoelectric pick-up device to monitor the operation of the motor shaft. Because the shell of the gear box and the front cover of the motor drive are integrally made together, the assembly process of the motor drive control device is simple. Because the photo chopper and the photoelectric pick-up device are installed inside the motor drive, they are well protected, and the motor drive control device can be conveniently mounted on upright supporting cushions on the door frame.

DETAILED DESCRIPTION OF THE PREFERRED EMBODIMENT

Figure 1:
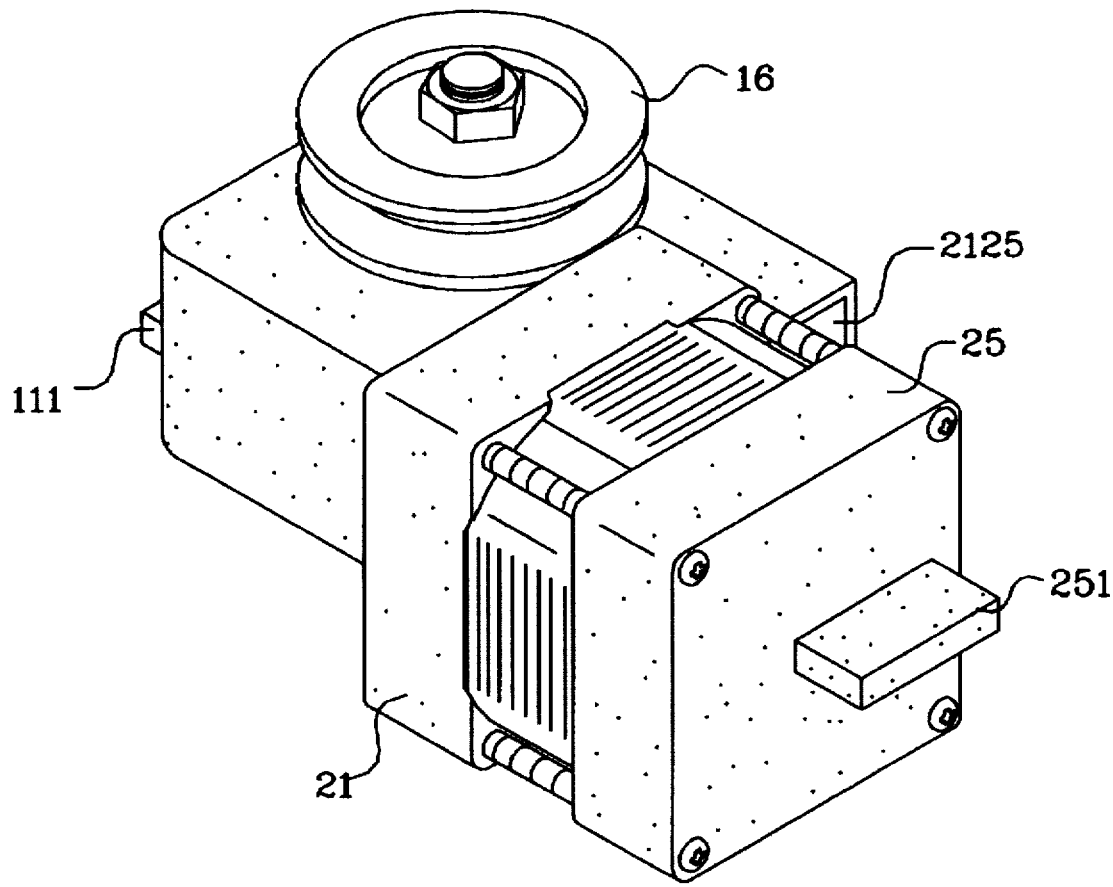
FIG. 1 is an elevational view of a power drive control device according to the present invention.
Figure 2:
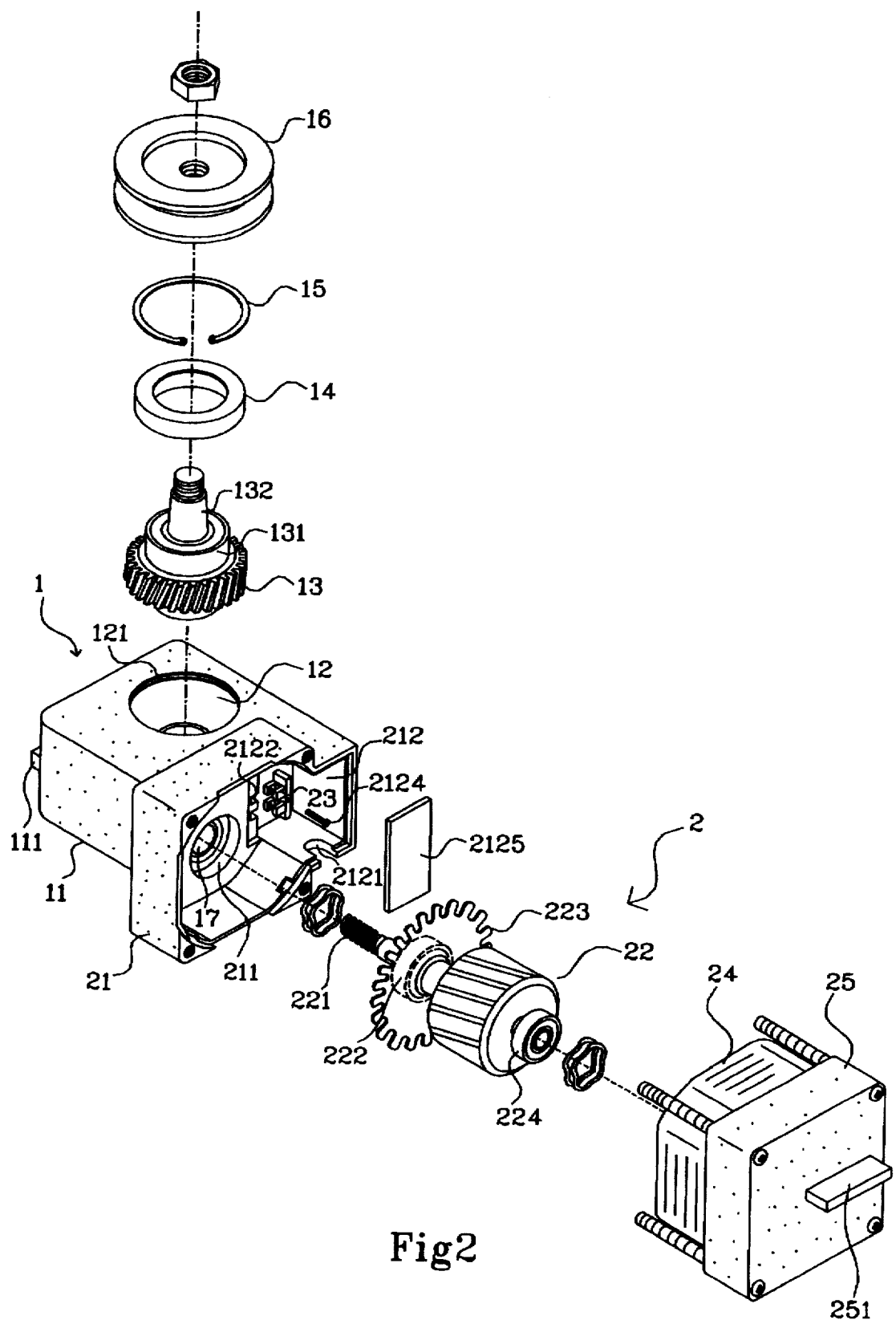
FIG. 2 is an exploded view of the power drive control device shown in FIG. 1.
Figure 3:
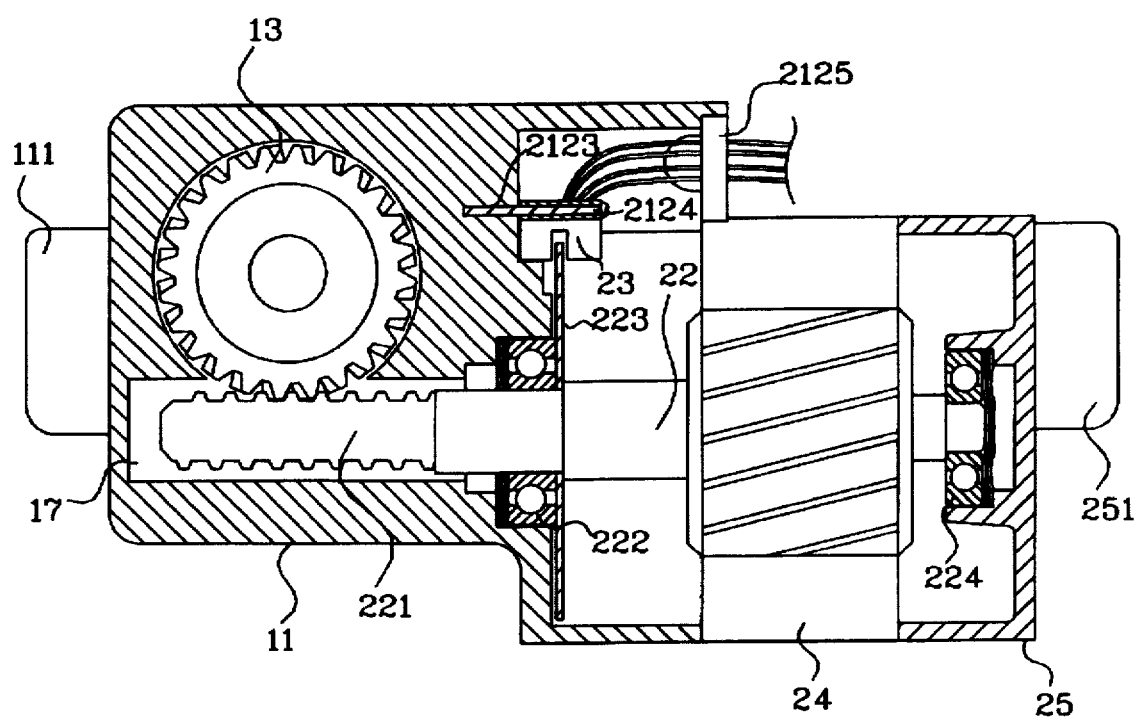
FIG. 3 is a sectional view of the power drive control device shown in FIG. 1.
Figure 4:
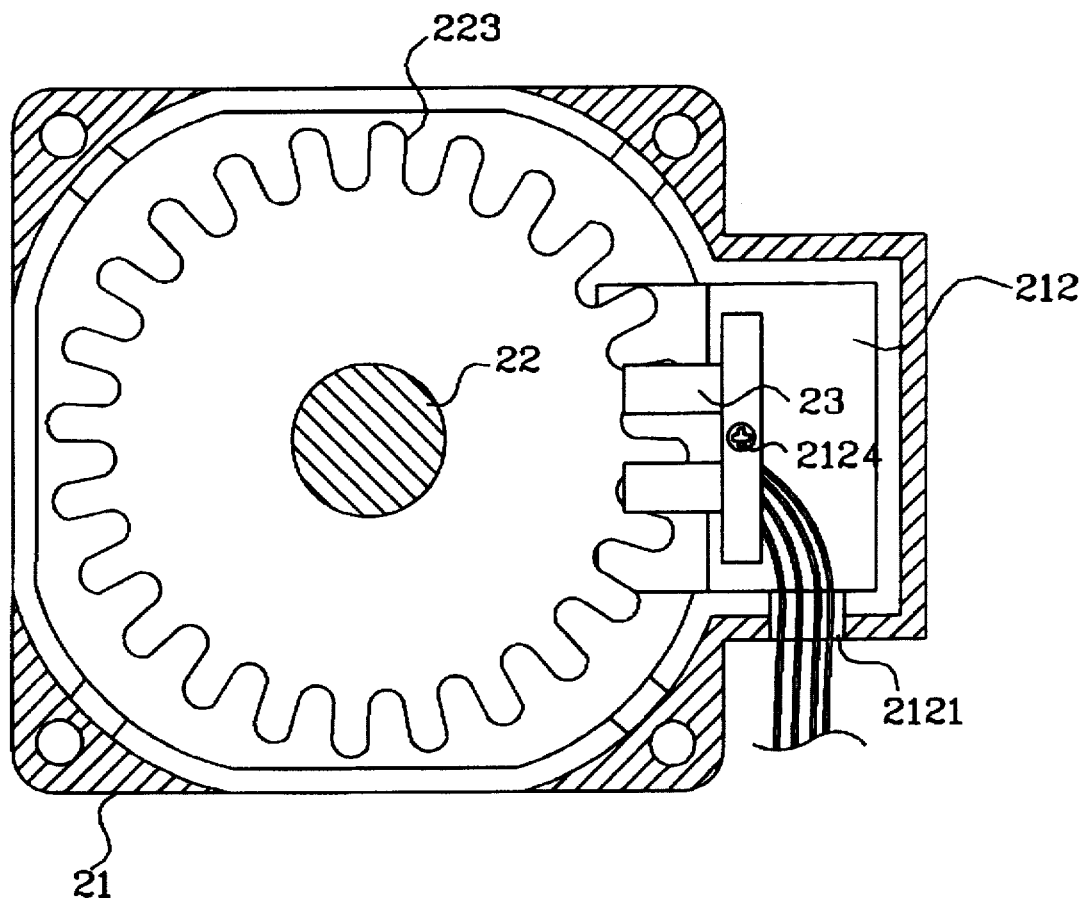
FIG. 4 is a sectional view in an enlarged scale of a part of the power drive control device shown in FIG. 1, showing the arrangement of the photo chopper and the photoelectric pick-up device.
Figure 5:
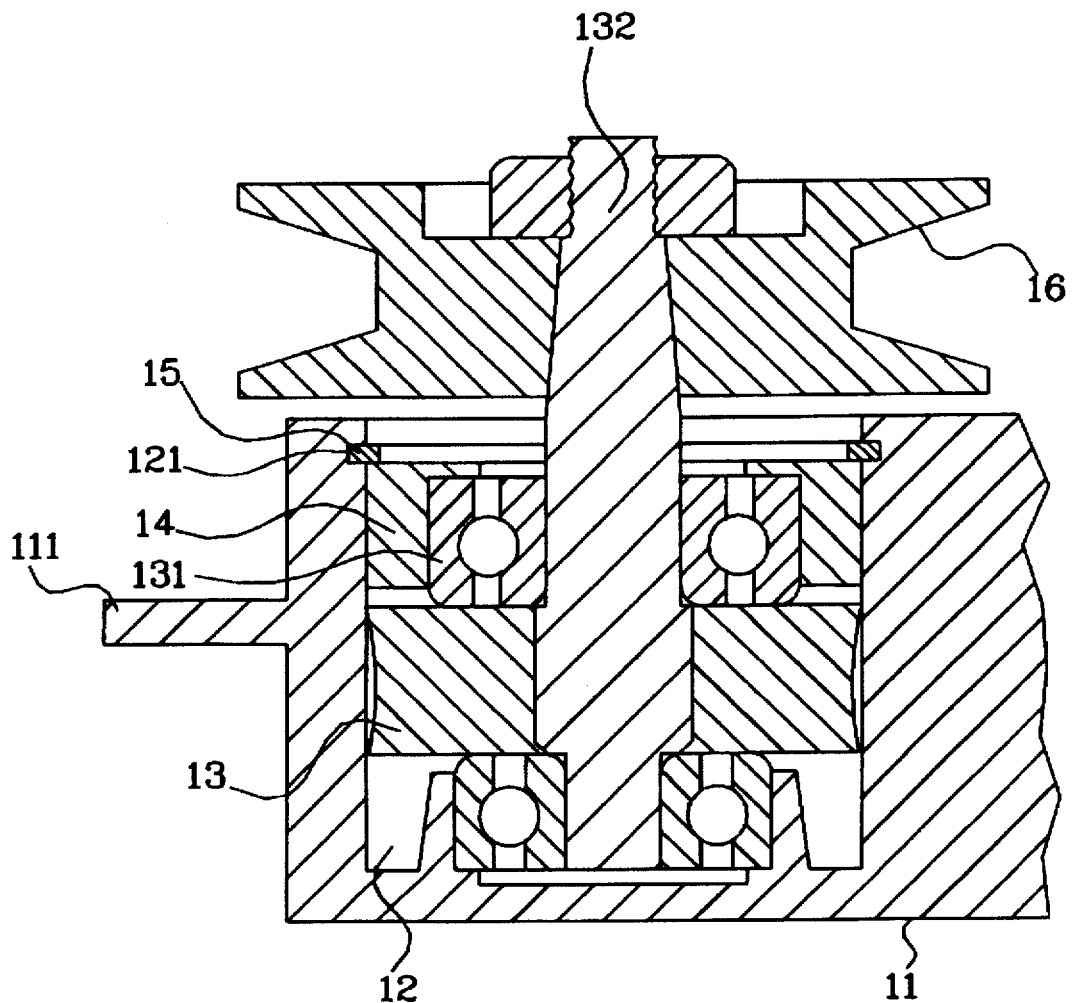
FIG. 5 is a sectional view in an enlarged scale of a part of the power drive controlled device shown in FIG. 1, showing the internal structure of the gear box.

Referring to FIGS. from 1 to 6, a power drive control device in accordance with the present invention comprises a gear box 1, and a motor drive 2. The motor drive 2 has a front cover 21 integrally made with the shell 11 of the gear box 1 together. The shell 11 of the gear box 1 has a front flange 111 for installation, a circular top opening 12, and a mounting groove 123 around the periphery of the circular top opening 12. A worm gear 13 is mounted in the circular top opening 12 inside the shell 11, having a bearing 131, and a worm shaft 132. A ring cap 14 is mounted around the bearing 131 inside the circular top opening 12. A clamp 15 is mounted in the mounting groove 123 to hold the bearing 13 and the bearing 131 inside the circular top opening 12 of the shell 11. A belt wheel 16 is fastened to the worm shaft 132 by a nut, and disposed outside the shell 11. The shell 11 further comprises an axle hole 17 disposed in communication with the circular top opening 12. The front cover 21 of the motor drive 2 has a locating hole 211 axially aligned with the axle hole 17. A worm 221 is inserted into the axle hole 17, having one end meshed with the worm gear 13, and an opposite end fixedly connected to a motor shaft 22 of the motor drive 2. The front cover 21 further comprises a receiving chamber 212 at one side, a bottom notch 2121 at the bottom of the receiving chamber 212, two recessed holes 2122, and a screw hole 2123. A photoelectric pick-up device 23 which is comprised of a photo transmitter and a photo receiver is mounted in the recessed holes 2122. A screw 2124 is threaded into the screw hole 2123 to secure the photoelectric pick-up device 23 in place. A front bearing 222 is mounted around the motor shaft 22 to hold a light chopper 223. The position of the light chopper 223 is at the center between the transmitters and receivers of the photoelectric pick-up device 23, so that picked up data can be sent to a control system 3.

During the assembly process, the front bearing 222 of the motor shaft 22 is mounted in the locating hole 211, then the photoelectric pick-up device 23 is mounted in the recessed holes 2122 and secured in place by the screw 2124, and then the electric wires of the photoelectric pick-up device 23 are inserted through the bottom notch 2121 and connected to the control system 3, and then a cover board 2125 is covered on the receiving chamber 212, and then a back cover 25 is covered on the front cover 21 to hold a stator coil 24 around the motor shaft 22. The back cover 21 has a rear flange 251 for installation.

Figure 6:
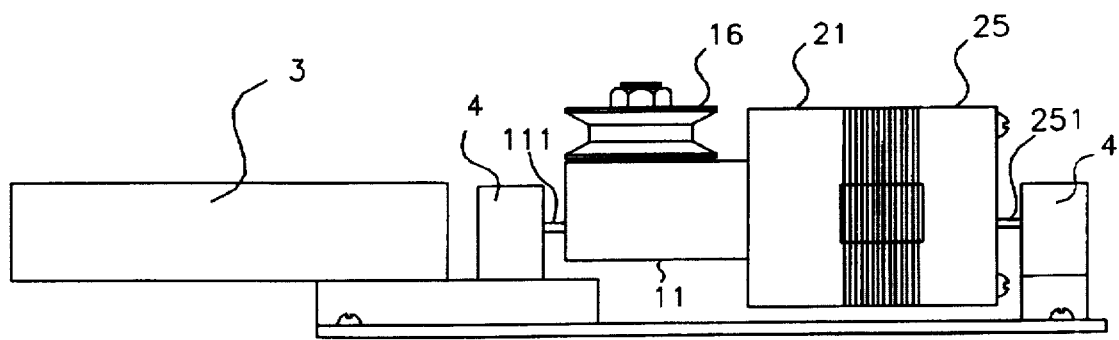
FIG. 6 is an installed view of the present invention, showing the power drive control device suspended from upright supporting cushions.

Referring to FIG. 6 again, the front flange 111 of the shell 11 and the rear flange 251 of the back cover 21 are respectively fastened to two upright supporting cushions 4, permitting the power drive control device to be suspended from the upright supporting cushions 4.

Figure 7:
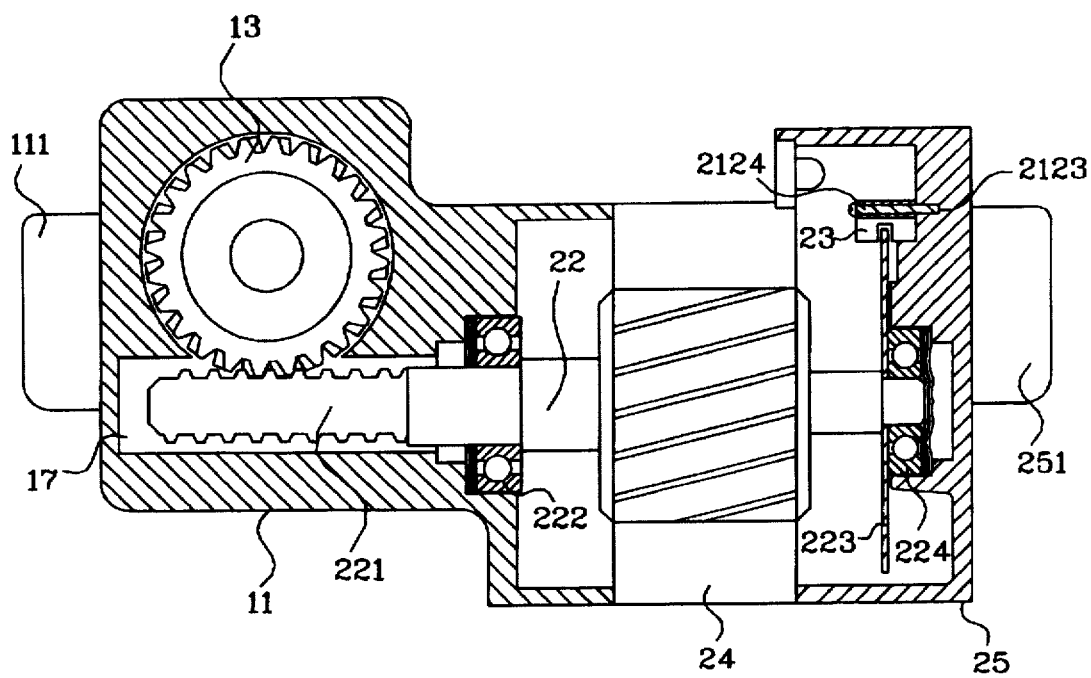
FIG. 7 shows another installation example of the photo chopper and the photoelectric pick-up device.
Figure 8:
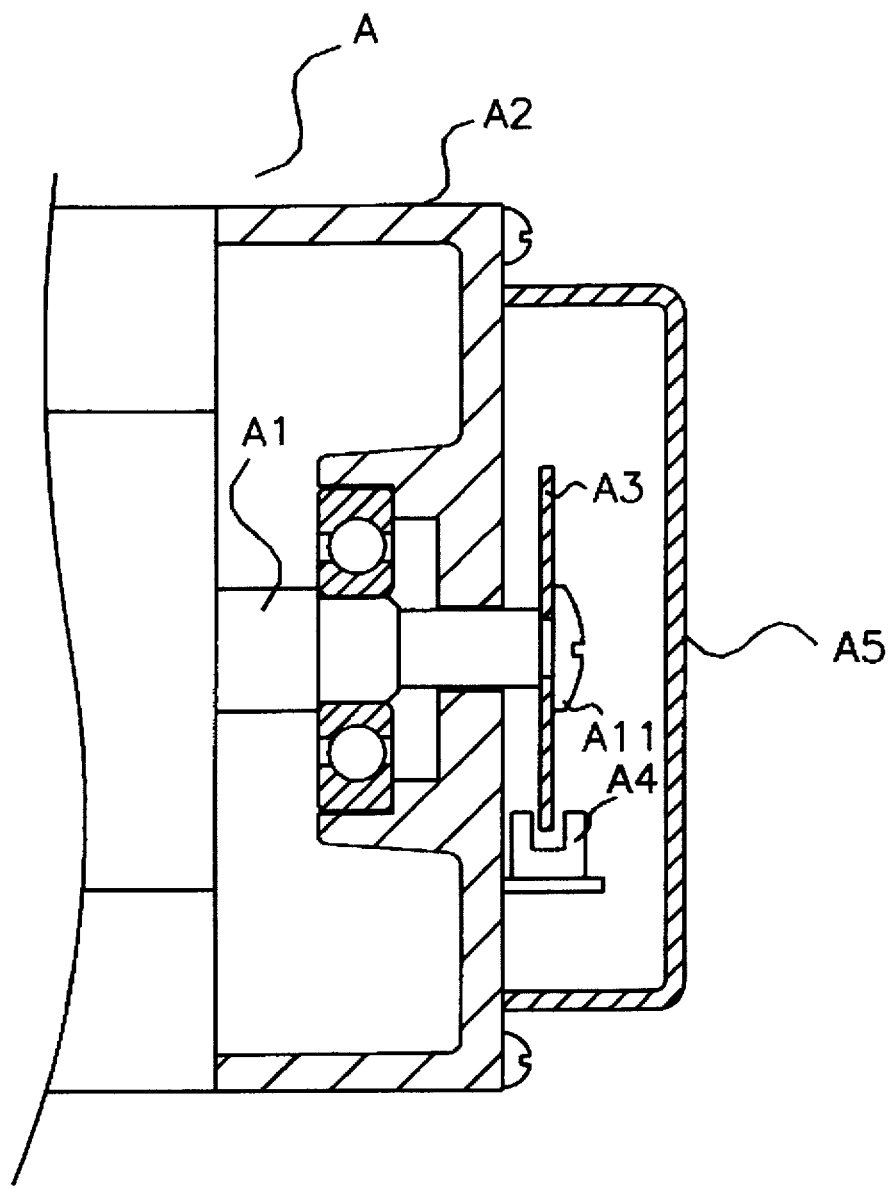
FIG. 8 is a sectional view of a part of a motor drive control device according to the prior art.
Figure 9:
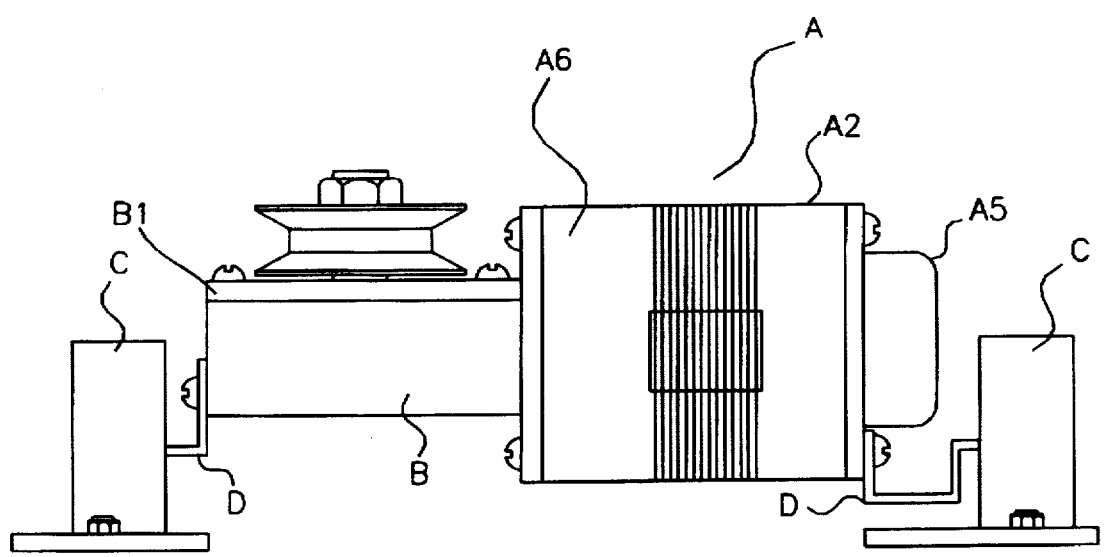
FIG. 9 is an installed view of the prior art motor drive control device.

Referring to FIG. 7, the light chopper 223 may be mounted around a rear bearing 224 on the motor shaft 22. When the light chopper 223 is mounted around the rear bearing 224, the photoelectric pick-up device 23 should be installed in the back cover 25 so that photoelectric data can be positively picked up.

Because the gear box 1 and the front cover 21 of the motor drive 2 are made together in integrity, the installation of the power drive control device is easy. Furthermore, because the photo chopper 223 and the photoelectric pick-up device 23 are mounted inside the motor drive 2 to detect the revolving speed of the motor drive 2, they are well protected, and the assembly process of the power drive control device is easy.

It is to be understood that the drawings are designed for purposes of illustration only, and are not intended as a definition of the limits and scope of the invention disclosed.

What the invention claimed is:

1. A power drive control device of an automatic door, comprising: a gear box having a shell; and a motor drive having a front cover integrally made with the shell of said gear box together, and a back cover covered on said front cover to hold a motor shaft, a stator coil around said motor shaft, a light chopper, and photoelectric pick-up means, said front cover comprising a receiving chamber having at least one recessed hole and one screw hole adapted for securing said photoelectric pick-up means in place, said light chopper being mounted around a bearing around said motor shaft to act with said photoelectric pick-up means, enabling said photoelectric pick-up means to monitor the operation of said motor shaft.

2. The power drive control device of claim 1 wherein said gear box comprises a circular top opening at the shell thereof, a mounting groove around the periphery of said circular top opening, a worm mounted in said circular top opening and coupled to said motor shaft and having a bearing at one side and a worm shaft extending out of the shell of said gear box and coupled to a belt wheel, a ring cap mounted around the bearing of said worm, and a clamp fastened to said mounting groove to hold said worm inside the shell of said gear box.

3. The power drive control device of claim 1 wherein the receiving chamber of the front cover of said motor drive has a bottom notch through which electric wires of said photoelectric pick-up means pass.

4. The power drive control device of claim 1 wherein said photo chopper is mounted around a bearing at one end of said motor shaft and disposed inside the back cover of said motor drive, and said photoelectric pick-up means is mounted inside the back cover of said motor drive to pick up photoelectric data.

\* \* \* \* \*